US011443111B2

(12) United States Patent
Aoyagi (10) Patent No.: US 11,443,111 B2
(45) Date of Patent: Sep. 13, 2022

(54) INFORMATION PROCESSING APPARATUS CAPABLE OF DETECTING ALTERATION IN SOFTWARE

(71) Applicant: CANON KABUSHIKI KAISHA, Tokyo (JP)

(72) Inventor: Takeshi Aoyagi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/684,414

(22) Filed: Nov. 14, 2019

(65) Prior Publication Data

US 2020/0160930 A1 May 21, 2020

(30) Foreign Application Priority Data

Nov. 19, 2018 (JP) .............................. JP2018-216895

(51) Int. Cl.
| | |
|---|---|
| *G06F 40/197* | (2020.01) |
| *G11C 29/02* | (2006.01) |
| *G06F 8/71* | (2018.01) |
| *G06F 21/57* | (2013.01) |
| *G06F 21/56* | (2013.01) |

(Continued)

(52) U.S. Cl.
CPC .............. *G06F 40/197* (2020.01); *G06F 1/08* (2013.01); *G06F 8/71* (2013.01); *G06F 21/566* (2013.01); *G06F 21/57* (2013.01); *G06F 21/572* (2013.01); *G06F 21/575* (2013.01); *G06F 21/577* (2013.01); *H04N 1/0088* (2013.01); *H04N 1/00885* (2013.01); *G06F 2221/033* (2013.01); *G11C 29/021* (2013.01);

(Continued)

(58) Field of Classification Search
CPC .......... G06F 40/197; G06F 8/71; G06F 21/57; G06F 21/572; G06F 21/575; G06F 21/577; G06F 21/566; G06F 1/08; G06F 2221/033; G11C 29/021; G11C 2029/0403; G11C 2029/4402; G11C 2029/5004; H04N 1/0088; H04N 1/00885
USPC ....................................... 717/170, 168, 169
See application file for complete search history.

(56) References Cited

U.S. PATENT DOCUMENTS

| | | | | |
|---|---|---|---|---|
| 7,337,335 B2* | 2/2008 | Jorgenson | ................. | G06F 1/08 713/300 |
| 7,657,764 B2* | 2/2010 | Jorgenson | ............... | G06F 1/329 713/300 |

(Continued)

FOREIGN PATENT DOCUMENTS

| | | |
|---|---|---|
| JP | 2005-322860 A | 11/2005 |
| JP | 2012138663 A | 7/2012 |

(Continued)

*Primary Examiner* — John J Tabone, Jr.
(74) *Attorney, Agent, or Firm* — Canon U.S.A., Inc. IP Division (57) ABSTRACT

An information processing apparatus includes a processor, an information storage unit, a voltage supply unit, and a control unit. The information storage unit is configured to hold information indicating a voltage to be supplied to the processor. The voltage supply unit is configured to supply a predetermined voltage to the processor based on the information stored in the information storage unit. The control unit is configured to detect an alteration in software to be executed by the processor, and to make a setting for supplying a predetermined voltage to a power source unit based on the information stored in the information storage unit.

18 Claims, 9 Drawing Sheets

(51) Int. Cl.
  *G06F 1/08* (2006.01)
  *H04N 1/00* (2006.01)
  *G11C 29/50* (2006.01)
  *G11C 29/44* (2006.01)
  *G11C 29/04* (2006.01)
(52) U.S. Cl.
  CPC ............... *G11C 2029/0403* (2013.01); *G11C 2029/4402* (2013.01); *G11C 2029/5004* (2013.01)

(56) References Cited

U.S. PATENT DOCUMENTS

| | | | | |
|---|---|---|---|---|
| 2006/0044926 A1* | 3/2006 | Mylly | ...................... | G11C 5/14 365/232 |
| 2006/0069903 A1* | 3/2006 | Fischer | ................... | G06F 21/81 713/1 |
| 2006/0136770 A1* | 6/2006 | Jorgenson | ............. | G06F 1/3203 713/500 |
| 2008/0133943 A1* | 6/2008 | Jorgenson | ............... | G06F 1/324 713/300 |
| 2008/0133944 A1* | 6/2008 | Jorgenson | ............... | G06F 1/329 713/300 |
| 2010/0175061 A1* | 7/2010 | Maeda | ...................... | G06F 8/65 717/173 |
| 2010/0223489 A1* | 9/2010 | Huang | ...................... | G06F 1/08 713/501 |
| 2012/0280673 A1* | 11/2012 | Watanabe | ............... | H02J 3/381 323/304 |
| 2013/0107653 A1* | 5/2013 | Kwak | ................... | G11C 16/10 365/218 |
| 2013/0124888 A1* | 5/2013 | Tanaka | ................... | G11C 16/06 713/320 |
| 2014/0074353 A1* | 3/2014 | Lee | ......................... | B60R 25/33 701/36 |
| 2014/0091624 A1* | 4/2014 | Park | ........................ | G06F 1/324 307/31 |
| 2014/0146600 A1* | 5/2014 | Sohn | ..................... | G11C 11/1673 365/158 |
| 2014/0345463 A1* | 11/2014 | Urata | ..................... | F24F 8/192 96/21 |
| 2014/0375533 A1* | 12/2014 | Kim | ...................... | G09G 3/3233 345/78 |
| 2015/0254458 A1* | 9/2015 | Hong | ..................... | G06F 21/57 726/22 |
| 2015/0323967 A1* | 11/2015 | Aoyagi | ................... | G06F 1/324 327/540 |
| 2016/0233857 A1* | 8/2016 | Kawaguchi | ............. | H03K 7/06 |
| 2016/0306635 A1* | 10/2016 | Nakajima | ............. | G06F 9/4401 |
| 2019/0027089 A1* | 1/2019 | Moribe | ................ | G09G 3/2003 |
| 2019/0050570 A1* | 2/2019 | Kannan | ............... | G06F 12/1491 |
| 2019/0265908 A1* | 8/2019 | Kim | ....................... | G06F 3/0659 |
| 2019/0294826 A1* | 9/2019 | Obara | ..................... | H04L 9/3242 |
| 2020/0090742 A1* | 3/2020 | Sekiguchi | ........... | G11C 11/5628 |
| 2020/0099815 A1* | 3/2020 | Ono | ..................... | G06F 21/572 |
| 2020/0151334 A1* | 5/2020 | Aoyagi | ............. | H04N 1/00938 |
| 2020/0411073 A1* | 12/2020 | Hwang | ............. | G11C 16/0483 |

FOREIGN PATENT DOCUMENTS

| | | |
|---|---|---|
| JP | 2013094980 A | 5/2013 |
| JP | 2015152998 A | 8/2015 |
| JP | 2016099837 A | 5/2016 |

\* cited by examiner

| PROCESS | PROCESS STAGE | STORED INFORMATION (3 BITS) | POWER VOLTAGE (V) |
|---|---|---|---|
| SLOW | 0 | 000 | 1.12 |
| ↑ | 1 | 001 | 1.09 |
| ↑ | 2 | 010 | 1.06 |
| ↑ | 3 | 011 | 1.03 |
| TYPICAL | 4 | 100 | 1.00 |
| ↓ | 5 | 101 | 0.97 |
| ↓ | 6 | 110 | 0.94 |
| FAST | 7 | 111 | 0.91 |

INFORMATION PROCESSING APPARATUS CAPABLE OF DETECTING ALTERATION IN SOFTWARE

BACKGROUND

Field

The present disclosure relates to an information processing apparatus capable of detecting an alteration in software.

Description of the Related Art

A known information processing apparatus has a function of detecting an alteration in software (hereinafter referred to as alteration detection) and inhibiting the execution of the software in which the alteration is detected. For example, a sub central processing unit (CPU) verifies software to be executed by a main CPU and, if the verification is successful, the main CPU executes the software. If the verification fails, the information processing apparatus inhibits the execution of the software.

A certain information processing apparatus is provided with a technique called Adoptive Supply Voltage (ASV) for changing the power supply voltage according to the individual difference of a device (for example, a CPU) (see Japanese Patent Application Laid-Open No. 2005-322860). For an individual FAST device (an individual device capable of operating at a predetermined frequency even with a voltage lower than a predetermined voltage), the operation at a predetermined frequency is implemented by supplying a voltage lower than the predetermined voltage, thus reducing the power consumption. For an individual SLOW device (an individual device which operates at a predetermined frequency only with a voltage higher than a predetermined voltage), the operation at a predetermined frequency is implemented by supplying a voltage higher than the predetermined voltage. Hereinafter, processing for setting a voltage based on the individual difference of a device is referred to as ASV processing.

For an individual SLOW device, the device operation may possibly become unstable if a clock signal with a predetermined frequency is input to the device before inputting a required voltage thereto. Therefore, a clock signal with a frequency lower than the predetermined frequency is input and kept in the device until the required voltage is input thereto. After the required voltage is input to the device, a clock signal with the predetermined frequency is input by using a Phase Locked Loop circuit (hereinafter referred to as a PLL circuit).

SUMMARY

Conventionally, a device itself to which a required voltage is input performs the ASV processing, and therefore it is necessary to first input a low-speed clock signal to the device to ensure the operation of the device. In addition, the device cannot fully operate before completion by the device of the verification of software to be executed by the device. More specifically, conventionally when the subject device to which a required voltage is input performs the ASV processing, it is necessary for the device to perform alteration detection processing for the software to be executed by the device using a low-speed clock signal. In view thereof, it has now been determined that the time required for the alteration detection processing is prolonged.

In view of the above-discussed considerations, the present disclosure features, among other things, an information processing apparatus capable of shortening the time required for alteration detection processing.

According to an aspect of the present disclosure, an information processing apparatus includes a processor, an information storage unit configured to store information indicating a voltage to be supplied to the processor, a voltage supply unit configured to supply a predetermined voltage to the processor based on the information stored in the information storage unit, and a control unit configured to detect an alteration in software to be executed by the processor, and to make a setting for supplying a predetermined voltage to a power source unit based on the information stored in the information storage unit.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings.

The present exemplary embodiment will be described below which is an example of an image forming apparatus having a print function and a scanning function as an information processing apparatus.

Figure 1:
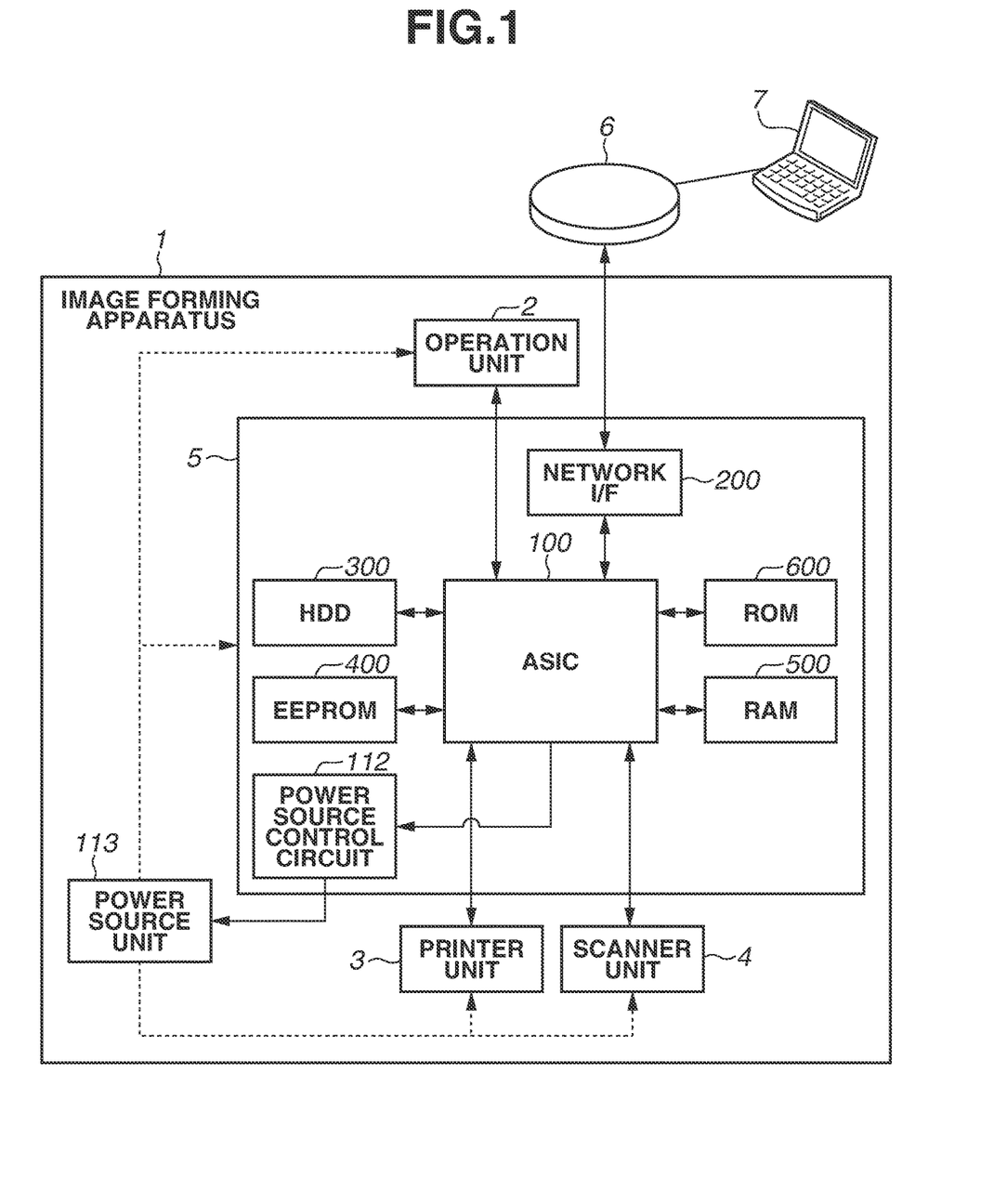
FIG. 1 illustrates an overall configuration of an image forming apparatus.

A first exemplary embodiment will be described below. FIG. 1 illustrates an overall configuration of the image forming apparatus.

An image forming apparatus 1 is provided with a web server for allowing a user to make various settings on the image forming apparatus 1 via a web browser of a personal computer (PC) 7. When the Internet Protocol (IP) address or the host name of the image forming apparatus 1 is input to an address input field in the web browser of the PC 7, the web browser receives a web page for making various settings from the image forming apparatus 1 and displays the web page on a display unit. The user can make settings on the image forming apparatus 1 via the web page for making various settings.

A configuration of the image forming apparatus 1 will be described below. The image forming apparatus 1 includes a plurality of function units (a printer unit 3 and a scanner unit 4), a control unit 5, an operation unit 2, a printer unit 3, a scanner unit 4, and a power source unit (voltage supply unit) 113.

The power source unit 113 supplies electric power to the control unit 5, the operation unit 2, the printer unit 3, and the scanner unit 4. The operation unit 2 includes a liquid crystal display (LCD) unit having a touch panel, and a keyboard. In addition, the operation unit 2 includes a power-saving button for shifting the power state of the image forming apparatus 1 to a sleep state. When the power-saving button is pressed in a standby state, the power state of the image forming apparatus 1 shifts from the standby state to the sleep state as a power-saving state. When the power-saving button is pressed in the sleep state, the power state of the image forming apparatus 1 shifts to the standby state. When the power supply to the printer unit 3 or the scanner unit 4 is stopped in the above-described sleep state, the sleep state may be either a deep sleep state where the power supply to the control unit 5 is stopped or a sleep state where the power supply to the control unit 5 is not stopped.

The printer unit 3 prints an image on paper by using image data received by the control unit 5 according to a print instruction received from the user. As the printing method for the printer unit 3, both the electrophotographic method for printing an image by fixing toner to paper and the ink-jet method for printing an image by discharging ink to paper are applicable. The scanner unit 4 reads an image of a document according to a reading instruction received from the user and transmits image data of the read image to the control unit 5.

The control unit 5 includes an Application Specific Integrated Circuit (ASIC) 100, a read only memory (ROM) 600, and a random access memory (RAM) 500. The control unit 5 further includes a hard disk drive (HDD) 300, an electrically erasable programmable ROM (EEPROM) 400, and a network interface (I/F) 200. The control unit 5 further includes a power source control circuit 112.

The control unit 5 performs various functions included in the image forming apparatus. The ASIC 100 reads a control program stored in the ROM 600 or the HDD 300 and performs printing control, reading control, and other various control. The RAM 109, a volatile memory, is a work memory used for execution of a control program. The HDD 300, which is a storage medium such as a magnetic disk, stores control programs and image data. The EEPROM 400, which is a nonvolatile memory, stores setting values to be referenced when a control program is executed.

A network I/F 200 receives print data and various data from the PC 7 via a network 6.

Upon reception of a request for shifting to the sleep state via the power-saving button, the power source control circuit 112 stops the power supply from the power source unit 113 to the printer unit 3 and the scanner unit 4. Accordingly, the image forming apparatus 1 enters the sleep state. Upon reception of a request for returning from the sleep state via the power-saving button, the power source control circuit 112 performs control to supply the power from the power source unit 113 to the printer unit 3 and the scanner unit 4.

<Configuration of ASIC 100>

Figure 2:
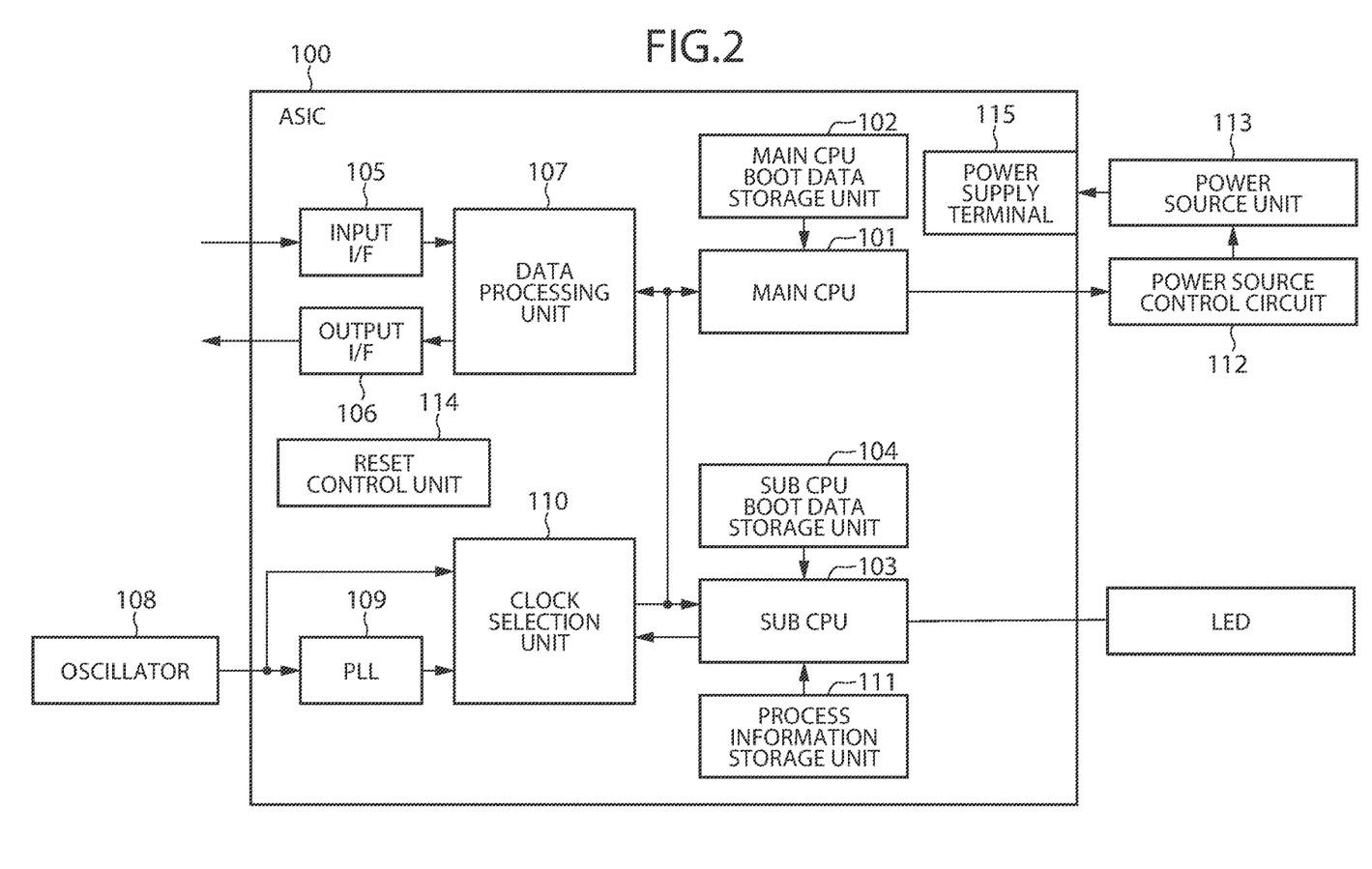
FIG. 2 is a block diagram illustrating an Application Specific Integrated Circuit (ASIC).

FIG. 2 is a block diagram illustrating the ASIC 100.

The ASIC 100 includes a main central processing unit (CPU) (processor) 101, a main CPU boot data storage unit 102, a sub CPU (control unit) 103, and a sub CPU boot data storage unit 104. The ASIC 100 further includes an input interface 105, an output interface 106, a data processing unit 107, a Phase Locked Loop (PLL) 109, and a clock selection unit (signal selection unit) 110. The ASIC 100 also includes a process information storage unit (holding unit) 111, a reset control unit 114, and a power supply terminal 115. The clock signal output unit of the present disclosure includes an oscillator 108, the PLL 109, and the clock selection unit 110.

The main CPU 101 controls each device in the ASIC 100. Basically, when a power voltage of 1.0V is supplied, the main CPU 101 can operate on a clock signal with a frequency of 1200 MHz. However, depending on the individual difference, the main CPU 101 can operate at 1200 MHz even if the power voltage is lower than 1.0V, and cannot operate at 1200 MHz if the supplied power voltage is not higher than 1.0V.

The storage unit 102 stores programs to be executed and various data to be used by the main CPU 101 in the boot process (hereinafter, these programs and various data are collectively referred to as boot data). The storage unit 102 is a ROM.

The sub CPU 103 performs auxiliary control for the main CPU 101.

The storage unit 104 stores programs to be executed and various data to be used by the sub CPU 103 in the boot process. The storage unit 104 is a ROM.

According to the present exemplary embodiment, when power of the image forming apparatus 1 is turned ON (when the ASIC 100 is reset), the sub CPU 103 boots up before the main CPU 101 does. More specifically, when power of the image forming apparatus 1 is turned ON (when the ASIC 100 is reset), the sub CPU 103 boots up by using the boot data stored in the storage unit 104 and verifies the boot data stored in the storage unit 102. When the sub CPU 103 determines, through the boot data verification, that no alteration is detected in the boot data to be executed by the main CPU 101, the main CPU 101 executes the boot program stored in the storage unit 102.

The input I/F (hereinafter simply referred to as an I/F) 105 is an interface for inputting data from the outside of the ASIC 100. The output interface 106 is an interface for outputting data to the outside.

The data processing unit 107 is a module for performing predetermined processing on data input from the input I/F 105. For example, the data processing unit 107 receives image data and performs image processing (for example, including enlargement, reduction, and correction) on the received image data.

The oscillator 108 supplies a clock signal to the ASIC 100. The oscillator 108 supplies, for example, a 10-MHz clock signal. The Phase Locked Loop (PLL) 109 is a circuit for converting the frequency of the clock signal supplied from the oscillator 108 into a desired frequency and outputting the clock signal. The PLL 109 converts the frequency (10 MHz) of the input clock signal into, for example, 1200 MHz which is 120 times the frequency of the input clock signal and outputs the clock signal.

A clock selection unit (multiplexer (MUX)) 110 receives a clock signal supplied by the oscillator 108 and a clock signal supplied by the PLL 109. The clock selection unit 110 outputs either one of the clock signal supplied by the oscillator 108 and the clock signal supplied by the PLL 109. According to the present exemplary embodiment, the clock selection unit 110 outputs either one of the clock signal supplied by the oscillator 108 and the clock signal supplied by the PLL 109 according to an instruction from the sub CPU 103. In order for the modules within the ASIC 100 (the main CPU 101, the sub CPU 103, the data processing unit 107, and other circuits) to synchronously transfer and receive data to/from each other, in this embodiment it is necessary that clock signals input to these modules are synchronized in phase with each other. Accordingly, according to the present exemplary embodiment, clock signals supplied to these modules are branched from the clock signal output from the clock selection unit 110. If the clock signals input to these modules are synchronized in phase with each other, these clock signals may be different in frequency.

The process information storage unit 111 stores process information (3-bit information) for the main CPU 101. The process information storage unit 111 is a ROM.

The power source control circuit 112 changes the voltage output by the power source unit 113. The power source control circuit 112 changes the voltage output from the power source unit 113 based on the process information stored in the process information storage unit 111. The power source unit 113 applies a voltage to the ASIC 100 via the power supply terminal 115. The power source unit 113 applies a predetermined voltage to the ASIC 100 based on a voltage control signal output from the power source control circuit 112.

The reset control unit 114 outputs a reset signal to each module in the ASIC 100. When power of the image forming apparatus 1 is turned ON (when the ASIC 100 is reset), the reset control unit 114 releases the reset of the sub CPU 103 and the storage unit 104. Then, according to an instruction from sub CPU 103, the reset control unit 114 releases the reset of the main CPU 101.

The ASIC 100 can operate in two different operation modes: a low-speed operation mode and a high-speed operation mode. In the low-speed operation mode, the clock selection unit 110 selects and outputs the clock signal input from the oscillator 108 according to an instruction from sub CPU 103. The output clock signal is used as clock signals for operating the main CPU 101, the sub CPU 103, and the data processing unit 107, as illustrated in FIG. 2. Although not illustrated in FIG. 2, clock signals are also input to circuits other than the above-described units.

Although, in FIG. 2, the clock signal output from the clock selection unit 110 is directly supplied to each module, a clock signal with a frequency reduced by a frequency divider may be supplied to each module.

In the high-speed operation mode, the clock selection unit 110 selects and outputs the clock signal input from the PLL 109 according to an instruction from the sub CPU 103. The output clock signal is used as clock signals for operating the main CPU 101, the sub CPU 103, and the data processing unit 107, as illustrated in FIG. 2. Although not illustrated in FIG. 2, clock signals are also input to circuits other than the above-described units.

<Flow of Operations of Sub CPU>

Figure 3:
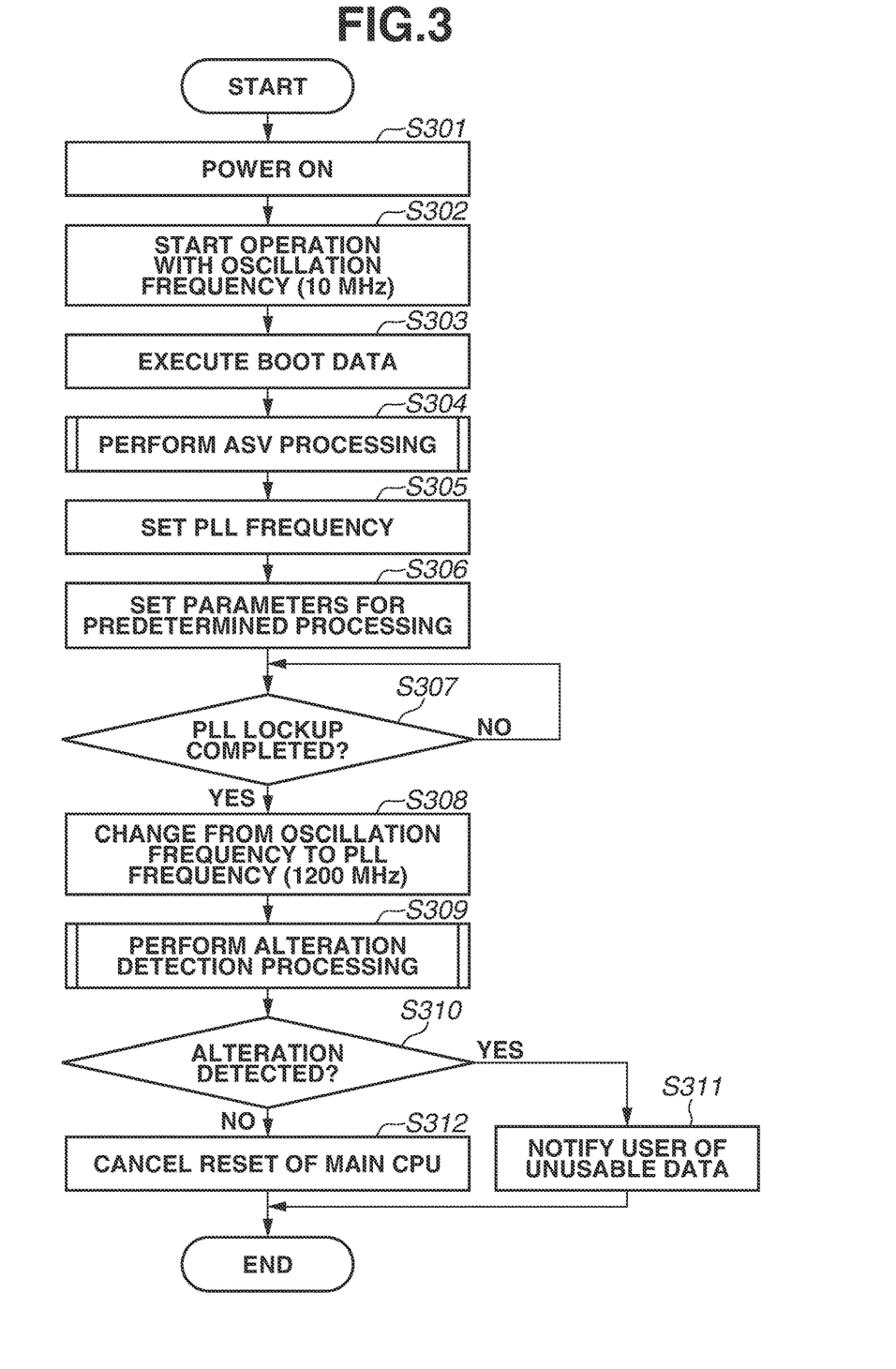
FIG. 3 is a flowchart illustrating processing executed by a sub central processing unit (CPU).

FIG. 3 is a flowchart illustrating processing executed by the sub CPU 103.

When power of the image forming apparatus 1 is turned ON by the user, in step S301, a reset signal is input to the ASIC 100. When the ASIC 100 is reset, the ASIC 100 enters the low-speed operation mode based on the initial setting. In step S302, the sub CPU 103 receives the clock signal (10 MHz) output from the oscillator 108. The reset control unit 114 releases the reset of the sub CPU 103 and the storage unit 104 through a hardware sequence. In step S303, the sub CPU 103 executes the boot data stored in the storage unit 104.

In step S304, according to the present exemplary embodiment, the sub CPU 303 performs Adoptive Supply Voltage (ASV) processing based on the 10-MHz clock signal. The ASV processing will be described in detail below.

In step S305, the sub CPU 103 makes settings so that the PLL 109 outputs a 1200-MHz clock signal. Accordingly, the PLL 109 oscillates a 1200-MHz clock signal. In step S306, the sub CPU 103 sets various parameters so that the data processing unit 107 performs predetermined processing. In step S307, the sub CPU 103 determines whether the lockup time of the PLL 109 has elapsed. The lockup time refers to a time period required for the PLL 109 to stably oscillate a predetermined frequency (1200 MHz in this case).

When the sub CPU 103 determines that the lockup time has elapsed (YES in step S307), the processing proceeds to step S308, In step S308, the sub CPU 103 changes the output of the clock selection unit 110 from the clock signal output from the oscillator 108 to the clock signal output from the PLL 109. Accordingly, the ASIC 100 enters the high-speed operation mode.

In step S309, the sub CPU 103 verifies the boot data of the main CPU 101. For example, the sub CPU 103 compares a correct value prestored in the storage unit 104 with a hash value of the boot data stored in the storage unit 102. When the two values are matched, the sub CPU 103 determines that the boot data has not been altered. On the other hand, when the two values are mismatched, the sub CPU 103 determines that the boot data has been altered. A method for detecting the boot data alteration will be described below.

When the sub CPU 103 determines that an alteration is detected in the boot data (YES in step S310), the processing proceeds to step S311. In step S311, the sub CPU 103 notifies the user and administrator of the boot data alteration (the main CPU 101 does not execute the boot data). The notification may be made by the lighting of a light emitting diode (LED) (light output unit) or the generation of sound.

On the other hand, when the sub CPU 103 determines that no alteration is detected in the boot data (NO in step S310), the processing proceeds to step S312. In step S312, the sub CPU 103 releases the reset of the main CPU 101 and other circuits. Accordingly, the main CPU 101 starts booting.

When the reset is released, the main CPU 101 starts the operation based on the clock signal output from the PLL 109. The main CPU 101 executes the boot data stored in the storage unit 102. This boot data has been verified and determined to be free from alteration.

<ASV Processing>

Figure 4:
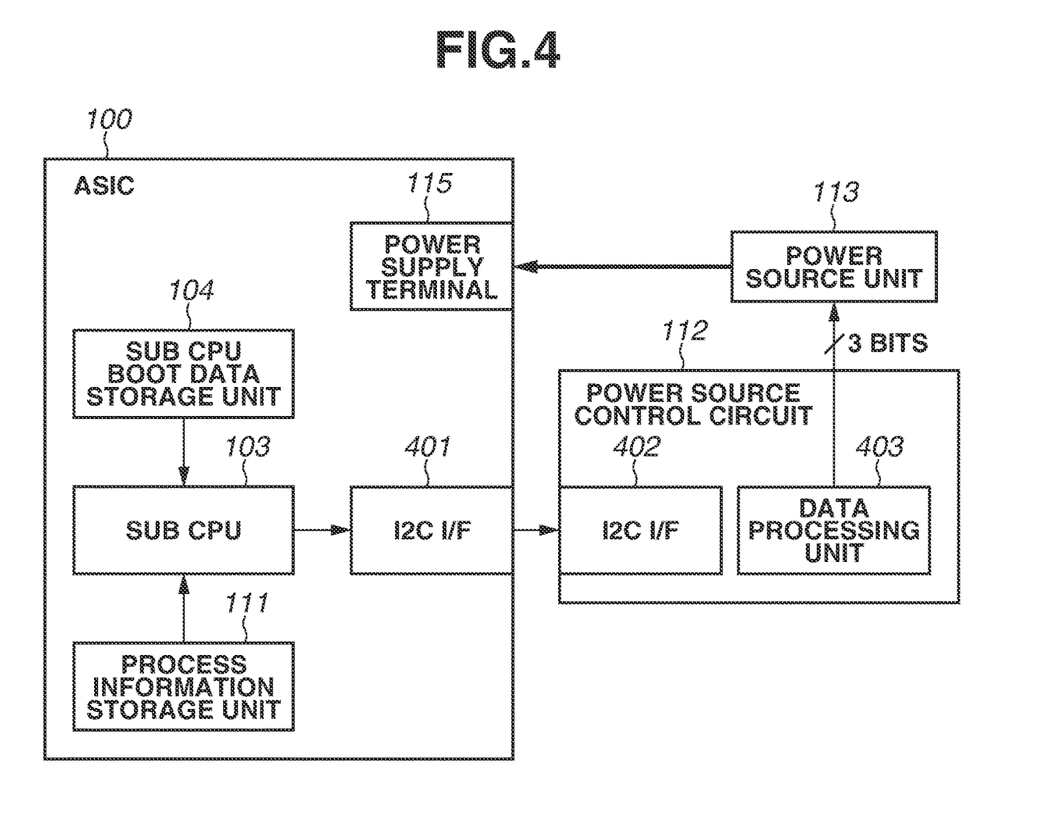
FIG. 4 is a detailed block diagram related to Adoptive Supply Voltage (ASV) processing.

The ASV processing in step S304 illustrated FIG. 3 will be described in detail below. FIG. 4 is a detailed block diagram related to the ASV processing.

The process information storage unit 111 stores the process information for the main CPU 101. The process information storage unit 111 is a ROM. According to the present exemplary embodiment, the process of the main CPU 101 is divided into eight different processes from SLOW to FAST each of which is represented by 3-bit data as process information stored in the process information storage unit 111.

Figure 5:
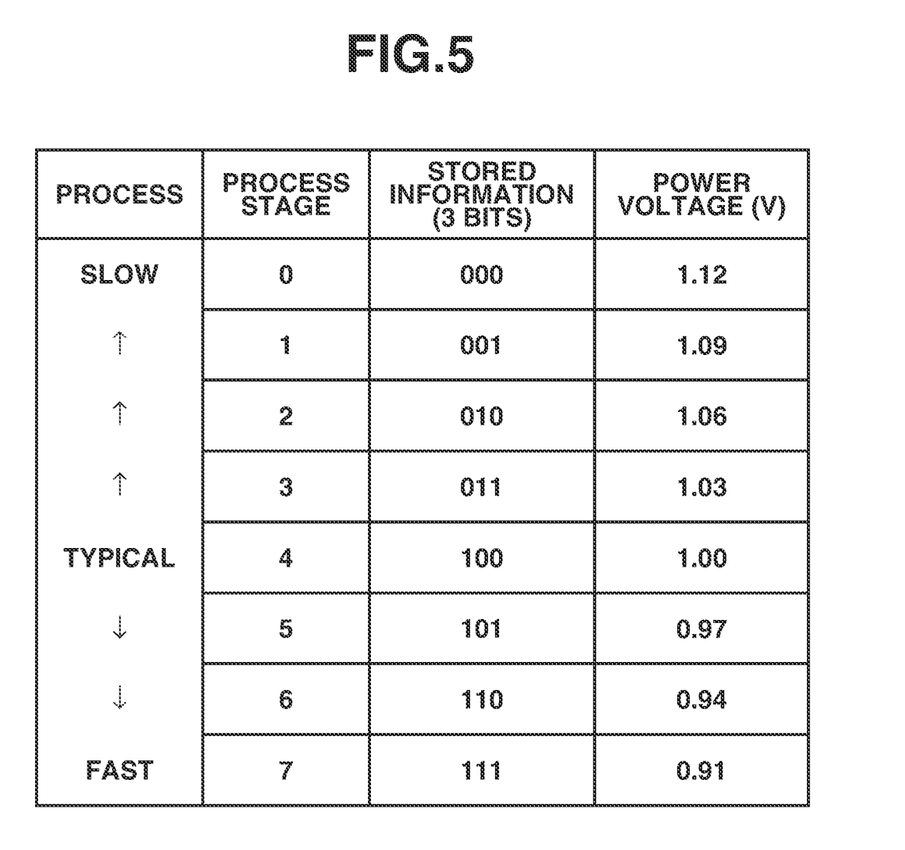
FIG. 5 illustrates information stored in a process information storage unit.

FIG. 5 illustrates details of the information stored in the process information storage unit 111. As illustrated in FIG. 5, the TYPICAL process is set to process stage "4" represented by 3-bit data "100", the SLOW process is set to process stage "0" represented by 3-bit data "000", and the FAST process is set to process stage "7" represented by 3-bit data "111".

Figure 7:
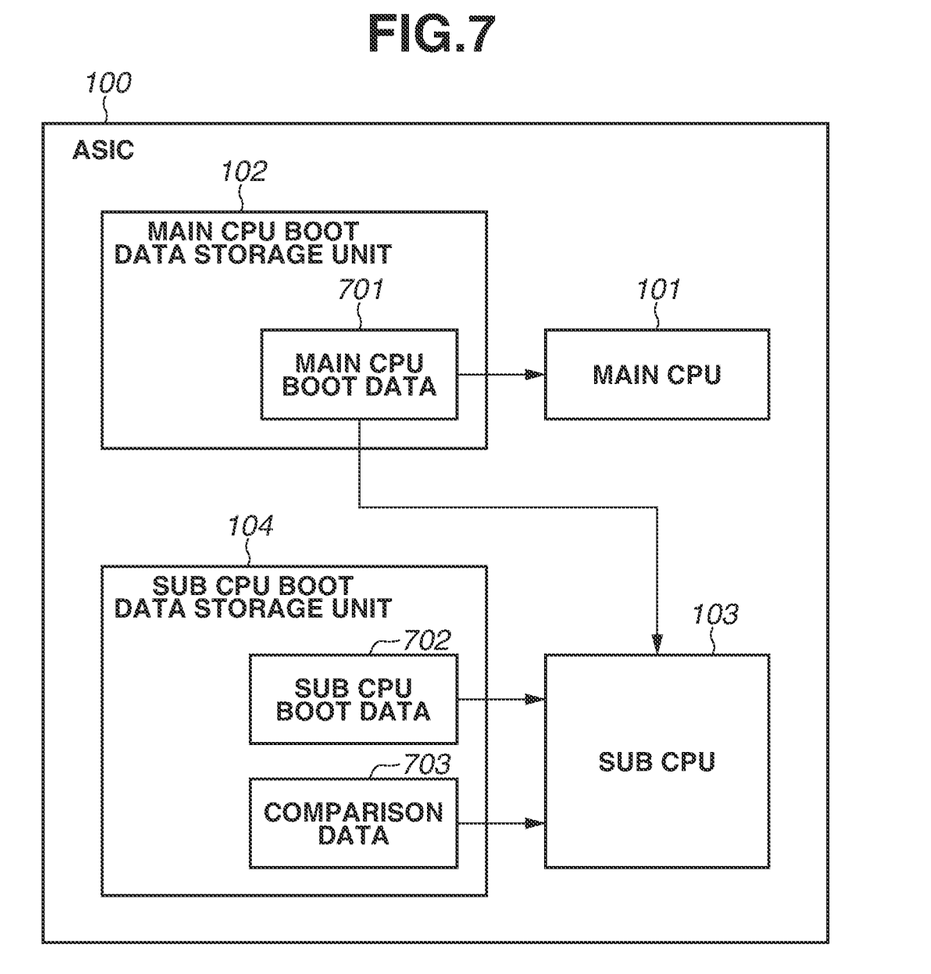
FIG. 7 is a detailed block diagram related to boot program verification.

The data processing unit 403 of the power source control circuit 112 outputs the 3-bit process information input via an I2C I/F unit 402 to the power source unit 113 as a 3-bit control signal. When power of the image forming apparatus 1 is turned ON, the power source unit 113 outputs the voltage for the TYPICAL process, i.e., 1.0V according to the present exemplary embodiment. Then, the power source unit 113 supplies a predetermined voltage to the power supply terminal 115 based on the control signal input from the power source control circuit 112. For example, as illustrated in FIG. 7, when the main CPU 101 is a chip for the TYPICAL process, the process information storage unit 111 outputs the 3-bit data "100". The power voltage supplied to the main CPU 101 is 1.0V. When the main CPU 101 is the lowest SLOW process, the process information storage unit 111 outputs the 3-bit data "000". The power voltage supplied to the main CPU 101 is 1.12V (refer to FIG. 8). When the main CPU 101 is the highest FAST process, the process information storage unit 111 outputs the 3-bit data "111". The power voltage supplied to the main CPU 101 is 0.91V (refer to FIG. 8).

Figure 6:
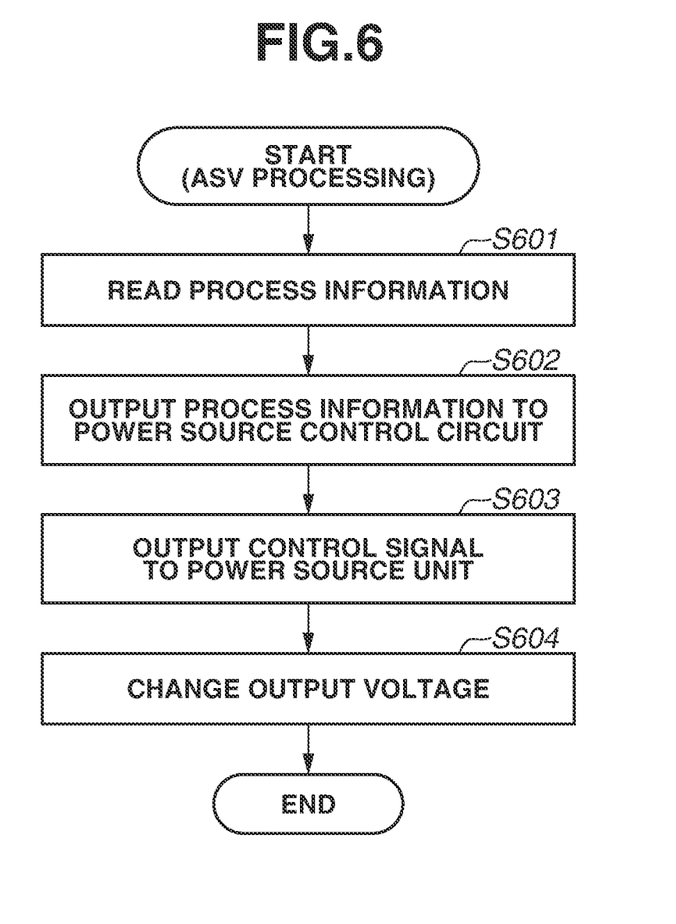
FIG. 6 is a flowchart illustrating details of the ASV processing.

FIG. 6 is a flowchart illustrating details of the ASV processing.

In step S601, the sub CPU 103 reads the recorded 3-bit process information from the process information storage unit 111. According to the present exemplary embodiment, the sub CPU 103 reads the data of a specific address in the process information storage unit 111 to read the recorded 3-bit process information of the main CPU 101. In step S602, the sub CPU 103 outputs the 3-bit process information to the power source control circuit 112. According to the present exemplary embodiment, the sub CPU 103 transmits the process information based on the Inter-Integrated Circuit (I2C) protocol.

The power source control circuit 112 receives the 3-bit process information input from the ASIC 100. In step S603, the data processing unit 403 outputs a control signal for changing the output voltage of the power source unit 113, to the power source unit 113. The power source unit 113 includes a 3-bit input terminal for controlling the output voltage. In step S604, the power source unit 113 adjusts the power voltage to be supplied to the main CPU 101 based on the control signal input to the input terminal.

The relation between the 3-bit control signal and the power voltage output by the power source unit 113 is illustrated in FIG. 5. When the 3-bit data "100" is input, the power source unit 113 outputs 1.0V to the main CPU 101. When the 3-bit data "110" is input, the power source unit 113 outputs 0.94V to the main CPU 101.

<Alteration Detection Processing>

The alteration detection processing for the boot program in step S309 illustrated in FIG. 3 will be described in detail below. FIG. 7 is a detailed block diagram related to boot program verification processing.

The storage unit 102 stores boot data 701 for the main CPU 101. When reset is released, the main CPU 101 reads and executes the boot data 701 for the main CPU 101 stored in the storage unit 102 to start booting. The storage unit 104 stores boot data 702 for the sub CPU 103. When reset is released, the sub CPU 103 reads and executes the boot data 702 for the sub CPU 103 stored in the storage unit 104 to start booting.

The storage unit 104 stores comparison data (correct value) to be compared with the boot data to be executed by the main CPU 101.

Figure 8:
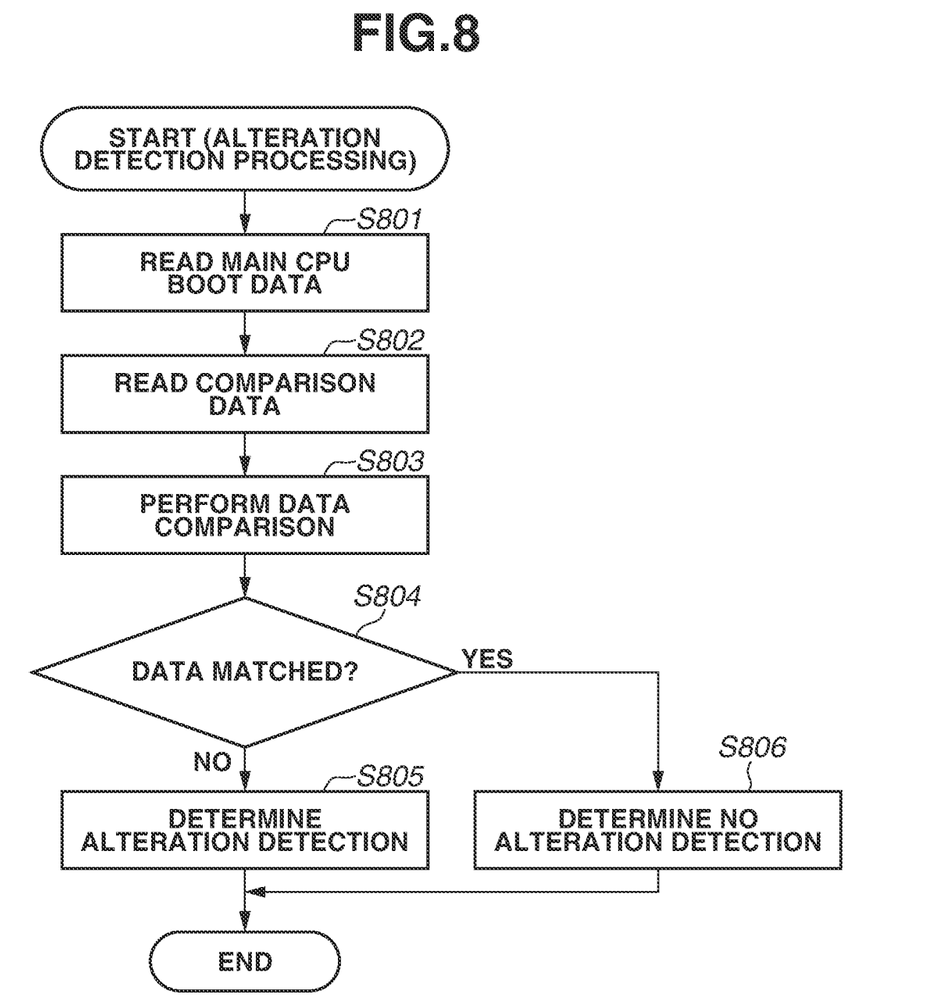
FIG. 8 is a flowchart illustrating processing for a boot program verification method.

FIG. 8 is a flowchart illustrating details of the alteration detection processing for the boot program.

In step S801, the sub CPU 103 reads a predetermined amount of data (for example, 100 Kbytes) from head data of the boot data 701 for the main CPU stored in the storage unit 102. The read data is stored in the buffer memory included in the sub CPU 103. In step S802, the sub CPU 103 reads the same amount of comparison data 703 as the amount of the data read from the storage unit 102. In step S803, the sub CPU 103 compares the boot data 701 for the main CPU 101 stored in the buffer memory with the comparison data 703. When the two pieces of data are mismatched as a result of the comparison, i.e., when the sub CPU 103 determines that an alteration is detected in the boot data 701 (NO in step S804), the processing proceeds to step S805.

On the other hand, when the two pieces of data are matched as a result of the comparison, i.e., when the sub CPU 103 determines that no alteration is detected in the boot data 701 (YES in step S804), the processing proceeds to step S806.

Although, in the present exemplary embodiment, the sub CPU 103 compares the boot data 701 itself for the main CPU 101 with the comparison data 703, the sub CPU 103 may verify the boot data 701 by calculating a hash value of the boot data 701 for the main CPU 101 and then comparing the hash value with the prestored correct value.

Although, in the present exemplary embodiment, the sub CPU 103 verifies part of the boot data 701 (100 KByte), the sub CPU 103 may verify all of the boot data 701.

A second exemplary embodiment will be described below. According to the first exemplary embodiment, the sub CPU 103 executes the ASV processing by using a low-speed clock signal (10 MHz). According to the second exemplary embodiment, the sub CPU 103 executes the ASV processing by using a high-speed clock signal (1200 MHz). Since the sub CPU 103 executes the ASV processing by using the high-speed clock signal, the activation time becomes shorter than that according to the first exemplary embodiment. The configurations of the image forming apparatus 1 and the ASIC 100 are like those according to the first exemplary embodiment, and redundant descriptions thereof will be omitted.

<Flow of Operations of Sub CPU>

Figure 9:
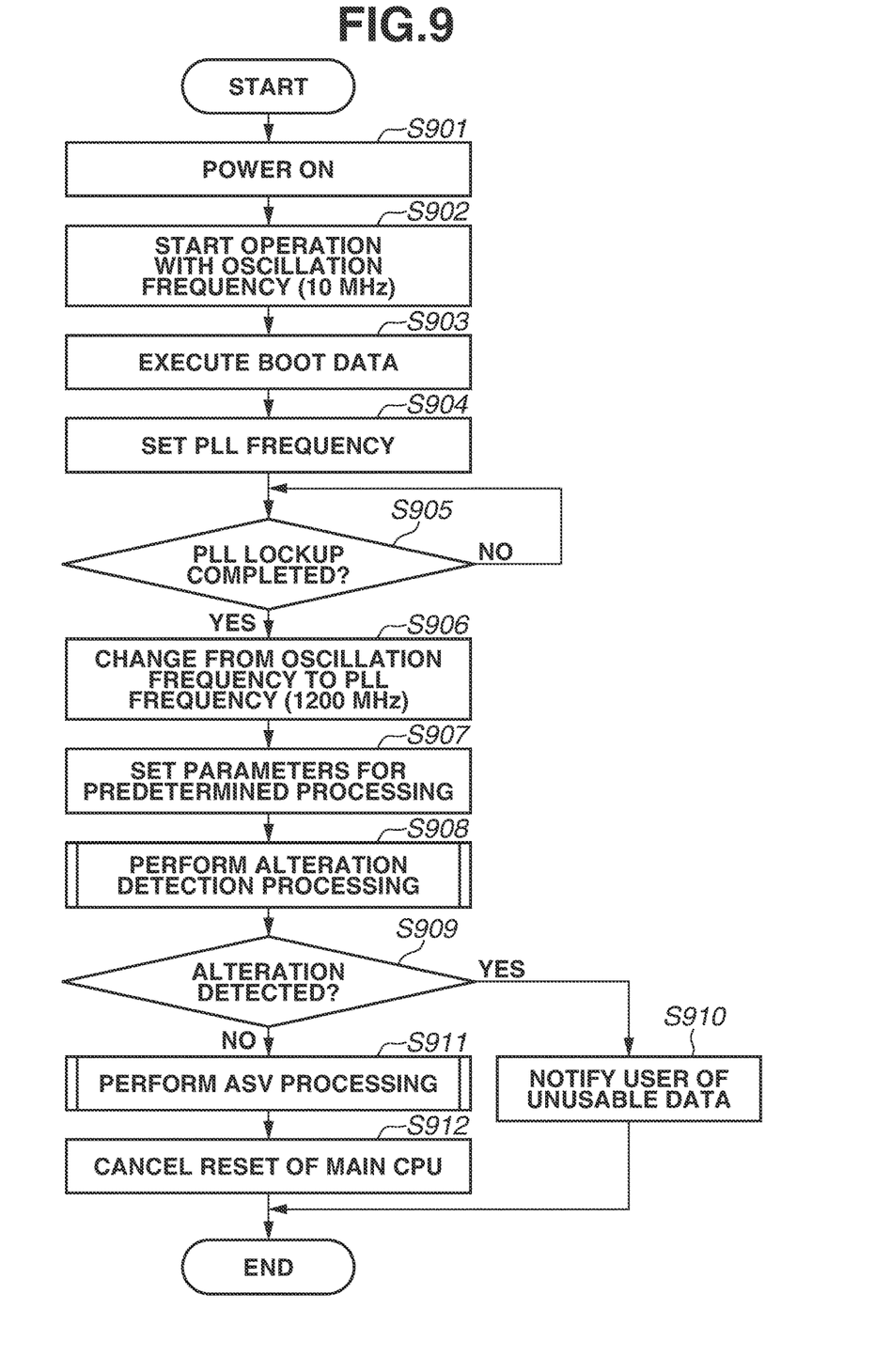
FIG. 9 is a flowchart illustrating processing executed by a sub CPU according to a second exemplary embodiment.

FIG. 9 is a flowchart illustrating processing executed by the sub CPU 103.

When power of the image forming apparatus is turned ON by the user, in step S901, a reset signal is input to the ASIC 100. When the ASIC 100 is reset, the ASIC 100 enters the low-speed operation mode based on the initial setting. In step S902, the clock signal (10 MHz) output from the oscillator 108 is input to the sub CPU 103. The reset control unit 114 releases the reset of the sub CPU 103 and the storage unit 104 through a hardware sequence. In step S903, the sub CPU 103 executes the boot data stored in the storage unit 104.

In step S904, according to the present exemplary embodiment, the sub CPU 103 makes settings so that the PLL 109 outputs a 1200-MHz clock signal. Accordingly, the PLL 109 oscillates a 1200-MHz clock signal. In step S905, the sub CPU 103 determines whether the lockup time of the PLL 109 has elapsed. The lockup time refers to a time period required for the PLL 109 to stably oscillate a predetermined frequency (1200 MHz in this case).

When the sub CPU 103 determines that the lockup time has elapsed (YES in step S905), the processing proceeds to step S906. In step S906, the sub CPU 103 changes the output of the clock selection unit 110 from the clock signal output from the oscillator 108, to the clock signal output from the PLL 109. Accordingly, the ASIC 100 enters the high-speed operation mode. In step S907, the sub CPU 103 sets various parameters so that the data processing unit 107 performs predetermined processing.

In step S908, the sub CPU 103 verifies the boot data of the main CPU 101. The method for verifying the boot data is like that according to the first exemplary embodiment, and redundant description thereof will be omitted.

When the sub CPU 103 determines that an alteration is detected in the boot data (YES in step S909), the processing proceeds to step S910. In step S910, the sub CPU 103 notifies the user and administrator of the boot data alteration (the main CPU 101 does not execute the boot data). The notification may be made by lighting of a light emitting diode (LED) (light output unit) or generation of sound.

On the other hand, when the sub CPU 103 determines that no alteration is detected in the boot data (NO in step S909), the processing proceeds to step S911. In step S911, the sub CPU 103 executes the ASV processing. The sub CPU 103 can perform the ASV processing by using the high-speed clock signal (1200 MHz) output from the PLL 109. Details of the ASV processing are illustrated in FIG. 6. When the ASV processing is completed, in step S912, the sub CPU 103 releases the reset of the main CPU 101 and others circuits, to start booting.

When the reset is released, the main CPU 101 starts the operation based on the clock signal output from the PLL 109. The main CPU 101 executes the boot data stored in the storage unit 102. The boot data has been verified and determined to be free from alteration.

(Other Embodiments)

According to the above-described exemplary embodiments, the sub CPU 103 executes alteration detection processing for the boot program of the main CPU 101 and the ASV processing. If a device other than the main CPU 101 executes the ASV processing, the sub CPU 103 does not need to perform the ASV processing.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-216895, filed Nov. 19, 2018, which is hereby incorporated by reference herein in its entirety.

What is claimed is:

1. An information processing apparatus comprising:
   a processor;
   a sub processor that is activated before activation of the processor;
   a storage configured to store information indicating a voltage to be supplied to the processor;
   a voltage supply configured to supply a voltage to, at least, the processor based on the information; and
   a voltage controller configured to control the voltage which the voltage supply is configured to supply,
   wherein the sub processor is capable of executing first processing of confirming whether a boot program to be executed by the processor is changed and second processing of transmitting the information read out of the storage to the voltage controller.

2. The information processing apparatus according to claim 1, wherein, upon receiving the information, the voltage controller causes the voltage supply to supply a predetermined voltage.

3. The information processing apparatus according to claim 2, wherein the sub processor makes a setting for supplying the predetermined voltage to a power source based on the information stored in the storage by using a clock signal of a first frequency, and detects an alteration in the boot program to be executed by the processor by using a clock signal of a second frequency which is higher than the first frequency.

4. The information processing apparatus according to claim 1, further comprising a clock signal output device configured to output clock signals with a plurality of frequencies, wherein the clock signal output device comprises:
   a first signal output device configured to output the clock signal of a first frequency;
   a second signal output device configured to output the clock signal of a second frequency which is higher than the first frequency; and
   a signal selection device configured to output either one of the clock signal of the first frequency and the clock signal of the second frequency.

5. The information processing apparatus according to claim 4, wherein the second signal output device converts the clock signal of the first frequency output from the first signal output device into the clock signal of the second frequency and outputs the resultant clock signal.

6. The information processing apparatus according to claim 5, wherein the second signal output device comprises a Phase Locked Loop.

7. The information processing apparatus according to claim 6, wherein the sub processor sets the frequency to be output by the clock signal output device.

8. The information processing apparatus according to claim 4,
   wherein the sub processor receives the clock signal of the first frequency and the clock signal of the second frequency,
   wherein, in a state in which the clock signal of the first frequency is received, the sub processor transmits the information to the voltage controller, and
   wherein, in a state in which the clock signal of the second frequency is received, the sub processor checks whether the boot program has been altered or not.

9. The information processing apparatus according to claim 4, wherein the sub processor receives the clock signal of the first frequency and the clock signal of the second frequency, wherein, in a state in which the clock signal of the second frequency is received, the sub processor checks whether the boot program has been altered or not, and wherein the sub processor transmits the information to the voltage controller after checking whether the boot program has been altered or not.

10. The information processing apparatus according to claim 1, wherein, by comparing part of the boot program to be executed by the processor with a prestored correct value, the sub processor verifies the boot program.

11. The information processing apparatus according to claim 1, wherein, by comparing a hash value of the boot program to be executed by the processor with a prestored correct value, the sub processor verifies the boot program.

12. The information processing apparatus according to claim 1, wherein the boot program is boot data for the processor.

13. The information processing apparatus according to claim 1, further comprising a printer configured to print an image on paper.

14. The information processing apparatus according to claim 1, further comprising a scanner configured to read an image of a document.

15. The information processing apparatus according to claim 1, wherein, in a case where the boot program to be executed by the processor has not been altered, the processor activates and executes the boot program.

16. The information processing apparatus according to claim 15, further comprising a light emitting diode (LED) configured to notify information, wherein, in a case where software the boot program to be executed by the processor has been altered, the LED notifies that the boot program has been altered.

17. The information processing apparatus according to claim 16, wherein the LED outputs light.

18. A method for controlling an information processing apparatus, the method comprising:

setting a voltage supply to supply a voltage to, at least, a processor based on information indicating a voltage to be supplied by the processor, wherein a storage is configured to store the information indicating the voltage to be supplied to the processor; and controlling, by a voltage controller, the voltage which the voltage supply is configured to supply, wherein a sub processor is capable of executing first processing of confirming whether a boot program to be executed by the processor is changed and second processing of transmitting the information read out of the storage to the voltage controller.

* * * * *